United States Patent [19]
Faris

[11] 4,189,124
[45] Feb. 19, 1980

[54] APPARATUS FOR SUSPENDING A PLANTER

[76] Inventor: Bernard L. Faris, R.F.D. 1, Box 166, Glen Allen, Va. 23060

[21] Appl. No.: 3,829

[22] Filed: Jan. 16, 1979

[51] Int. Cl.² ............................................. F16M 13/00
[52] U.S. Cl. .................................. 248/318; 248/323; 211/115; 47/67
[58] Field of Search ............... 211/115; 248/323, 324, 248/317, 318, 418, 417; 47/67

[56] References Cited

U.S. PATENT DOCUMENTS

| | | | |
|---|---|---|---|
| 1,210,932 | 1/1917 | Halliday | 248/317 |
| 2,640,601 | 6/1953 | Van Wie | 211/115 |
| 3,957,242 | 5/1976 | Holtz | 248/318 |
| 3,985,327 | 10/1976 | Holtz | 248/318 |
| 4,117,630 | 10/1978 | Kalas | 248/318 |

*Primary Examiner*—Francis K. Zugel
*Attorney, Agent, or Firm*—Norman B. Rainer

[57] ABSTRACT

An apparatus is provided which facilitates the controlled rotative positioning of a planter suspended from an overhead support. The apparatus is comprised of two facing toothed members, a vertically disposed pull rod and associated bearing pin, position restoring means acting upon said pull rod, and harness means to maintain the several components in proper spaced alignment. The apparatus is attached to an overhead support, and a planter is attached by tether means to said pull rod. The apparatus causes the planter to undergo controlled horizontal rotative movement when the planter is momentarily pushed upward to remove the downward force acting upon said pull rod, and then released.

8 Claims, 2 Drawing Figures

APPARATUS FOR SUSPENDING A PLANTER

BACKGROUND OF THE INVENTION

1. Field of the Invention

This invention relates to apparatus adapted to facilitate the controlled rotative movement of an object suspended by supple tether means, and more particularly to the controlled rotation of a suspended house plant about its vertical axis.

2. Description of the Prior Art

In many instances it is desired to hang an object from a ceiling while also enabling the object to be rotatable in a horizontal plane. This is particularly important when suspending living plants from a ceiling. In such instances it is desirable to rotate the plant in order to successively expose all portions of the plant to light such as natural daylight coming in from a window, thereby promoting symmetrical growth of the plant.

Indoor plants rooted in suitable containers known as planters are frequently suspended from the ceiling of a room of a house by means of hook and eye arrangements adjacent the ceiling. Flexible tether means such as ropes, chains, wires, ribbons or the like depend from the hook and eye combination to support the planter. When it is desired to change the position of the planter, the hook must be disengaged from the eye and re-engaged in the opposite, 180° position. This is not an easily accomplished task because the planter may be of considerable weight, and the transaction must be accomplished with the aid of a step stool, chair, ladder or other means providing sufficient elevation to reach the ceiling. Such manner of suspending a planter also provides only two positional configurations.

Several expedients have been disclosed in the art for coping with the aforementioned difficulty. For example, manually rotable devices which attach to the ceiling and support a hanging planter have been described in U.S. Pat. Nos. 3,957,242 and 3,985,327 to Holz. Such devices, although obviating the need to disconnect the planter, are difficult to rotate unless physically grasped, and therefore do not obviate the need for climbing means to reach the ceiling. If one were to merely turn the planter, causing twisting of the tether lines and consequent transmission of torque to the rotatable device of Holz, the resultant amount of rotation would be difficult to control, and damage may be caused to the plant or tether lines. A further potential shortcoming of the Holz device is that, from one occasion of rotation to the next, the user may forget in which direction the planter should be rotated for even exposure to daylight.

The apparatus of U.S. Pat. No. 4,117,630 to Kalas overcomes the need to grasp a ceiling-mounted fixture by employing a clock motor to continuously rotate a planter unidirectionally. The Kalas device is however of complex construction and does not readily provide for manual override of the clock cycle to compensate for variable lighting conditions. It further necessitates the use of a hanging weight and pull-ring which may detract from the appearance of the planter, and requires that the user reach the pull-ring which may be located considerably closer to the ceiling than the planter.

It is accordingly an object of the present invention to provide apparatus for suspending a planter from an overhead support in a manner which will permit rotation of said planter without disengagement from said device.

It is another object to provide an apparatus of the aforesaid nature which provides controllable unidirectional rotation of said planter.

It is a still further object of this invention to provide an apparatus of the aforesaid nature of simple construction which affords controlled rotation of said planter without requiring the user to reach above said planter.

These objects and other objects and advantages of the invention will be apparent from the following description.

SUMMARY OF THE INVENTION

The above and other beneficial objects and advantages are accomplished in accordance with the present invention by the provision of a rotative apparatus having upper and lower coaxially spaced circular toothed members of equal diameter, the facing or proximal ends of which are cut away to form an even number of uniformly spaced vertically disposed teeth, each having a vertical edge parallel to the axis of said toothed member and an angled edge meeting with said vertical edge as an apex at the outermost reach of said teeth and forming a substantially V-shaped bight at the base of said teeth to produce a sawtooth pattern. The configurations of the teeth of both toothed members are substantially identical but of reversed direction. The toothed members are aligned such that the positions of said vertical edges of the teeth of one toothed member are opposite the angled edges of the teeth of the facing toothed member.

A pull rod is coaxially positioned with respect to said toothed members, extending below the lower or distal end of said lower toothed member, and adapted for axial movement. The portion of said pull rod which extends below the distal end of said lower toothed member is provided with means for engaging the tether lines of a planter.

A bearing pin is transversely associated with said pull rod adjacent its uppermost extremity and is adapted to engage the aforesaid teeth at two sites diametrically opposed with respect to the axis of said toothed members. Said bearing pin engages teeth of the lower toothed member when significant downward force is applied to the pull rod. Restoring means associated with said pull rod cause the bearing pin to engage the upper toothed member when said downward force is removed. Said restoring means may have the form of a coil spring positioned on the pull rod.

The toothed members are held in fixed spaced relationship by a rigid spacing harness which may be a complete enclosure, a framework, or equivalent structure. Hanging means are associated with the top of said spacing harness whereby the apparatus may be attached to a hook or eye member in an overhead support such as a ceiling.

In operation, the apparatus is attached to a ceiling support by said hanging means. Tether lines, which pendantly support a planter, are attached to said pull rod adjacent a lower portion thereof. When it is desired to modify the rotational position of the planter, said planter is merely pushed upwardly from underneath so that the tether lines become momentarily slack. This action releases the downward compressive force on the restoring means, permitting it to push the pull rod and associated bearing pin upward. The bearing pin consequently rises from the bights of the lower toothed member in which it was resting and travels upward into contact with the opposed angled edges of the teeth of the upper toothed member. Both ends of the bearing pin are accordingly displaced horizontally and in the same rotative direction by sliding contact with said angled edges. The bearing pin stops its upward and rotative motion when it reaches the bights at the upper extremes of the angled edges of the teeth of said upper toothed member. When the planter is released, its weight causes compression of the restoring means with attendant downward motion of the pull rod and bearing pin assembly. In its downward motion, the bearing pin will travel along vertical edges of the teeth of the upper toothed member, and then engage angled edges of opposed teeth of the lower toothed member. In sliding engagement with said angled edges, the bearing pin will be rotatively displaced until it achieves abutment with the adjacent vertical edges at the bights of the teeth of the lower toothed member.

The combined effect of the displacements achieved in the upward and downward motions is to rotatively shift the position of the bearing pin from one bight to the next adjacent bight amongst the teeth of the lower toothed member. The basic effect of the device is to utilize the linear motion of the pull rod to generate a rotative motion. The degree of turning achieved in each up-and-down motion of the planter is dependent upon the spacing of the bights of said lower toothed member. By repeatedly raising and releasing the planter, any desired total amount of rotation may be secured. If, for example, each of the toothed members contains four projections, a single up and down cycle of the pull rod would achieve 90° of rotation, in which case a single raising and releasing of the planter should provide adequate daily rotation for most plants.

BRIEF DESCRIPTION OF THE DRAWINGS

In the accompanying drawing forming a part of this specification and in which similar numerals of reference indicate corresponding parts in all the figures of the drawing.

DESCRIPTION OF THE PREFERRED EMBODIMENTS

Figure 1:
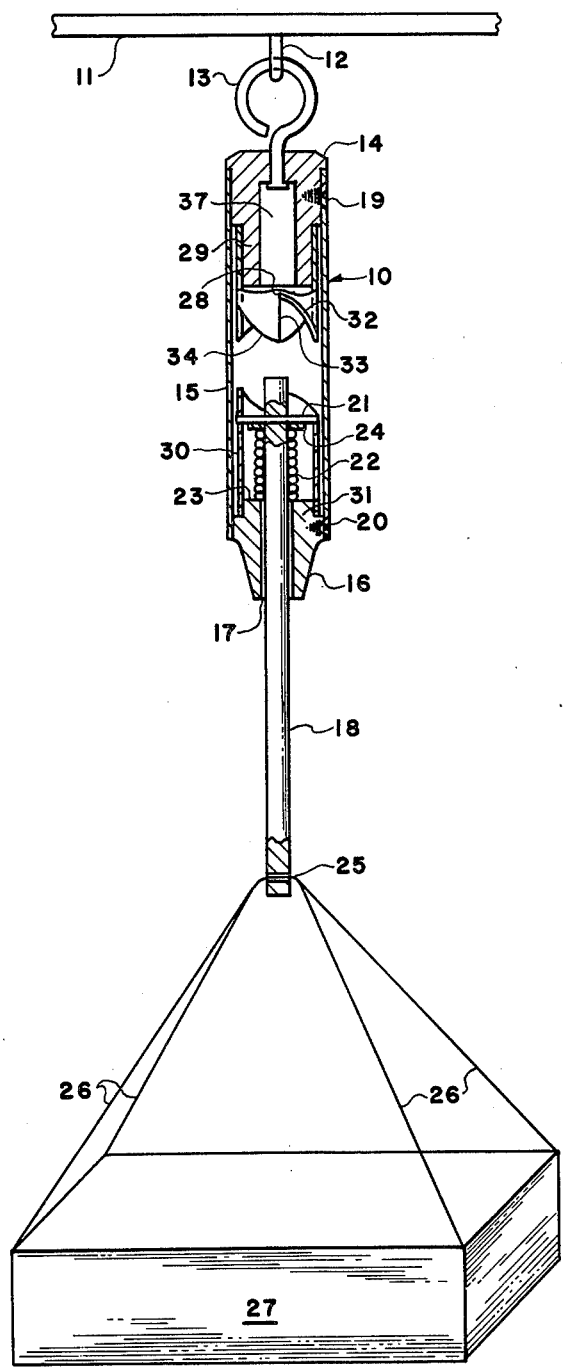
FIG. 1 is a vertical sectional view of an embodiment of the apparatus of the present invention attached to a ceiling and utilized to suspend a planter by tether lines.

Referring to FIG. 1, an apparatus 10 of the present invention is attached to a ceiling 11 by means of a hook 12 inserted in said ceiling and an eye 13 affixed to the center of upper closure 14. Spacing harness 15, having a cylindrical form, engages upper closure 14 and lower closure 16 by screws 19 and 20 respectively. An axial channel 17 in lower closure 16 permits insertion of pull rod 18. Bearing pin 21 is mounted adjacent the upper end of pull rod 18 and perpendicular thereto. A coil spring 22 is positioned on pull rod 18, sandwiched between the upper surface 23 of lower closure 16, and a washer 24 in abutment with bearing pin 21. A hole 25 in pull rod 18 adjacent the lower end thereof enables tether lines 26 to engage said pull rod and thereby support the planter 27.

Figure 2:
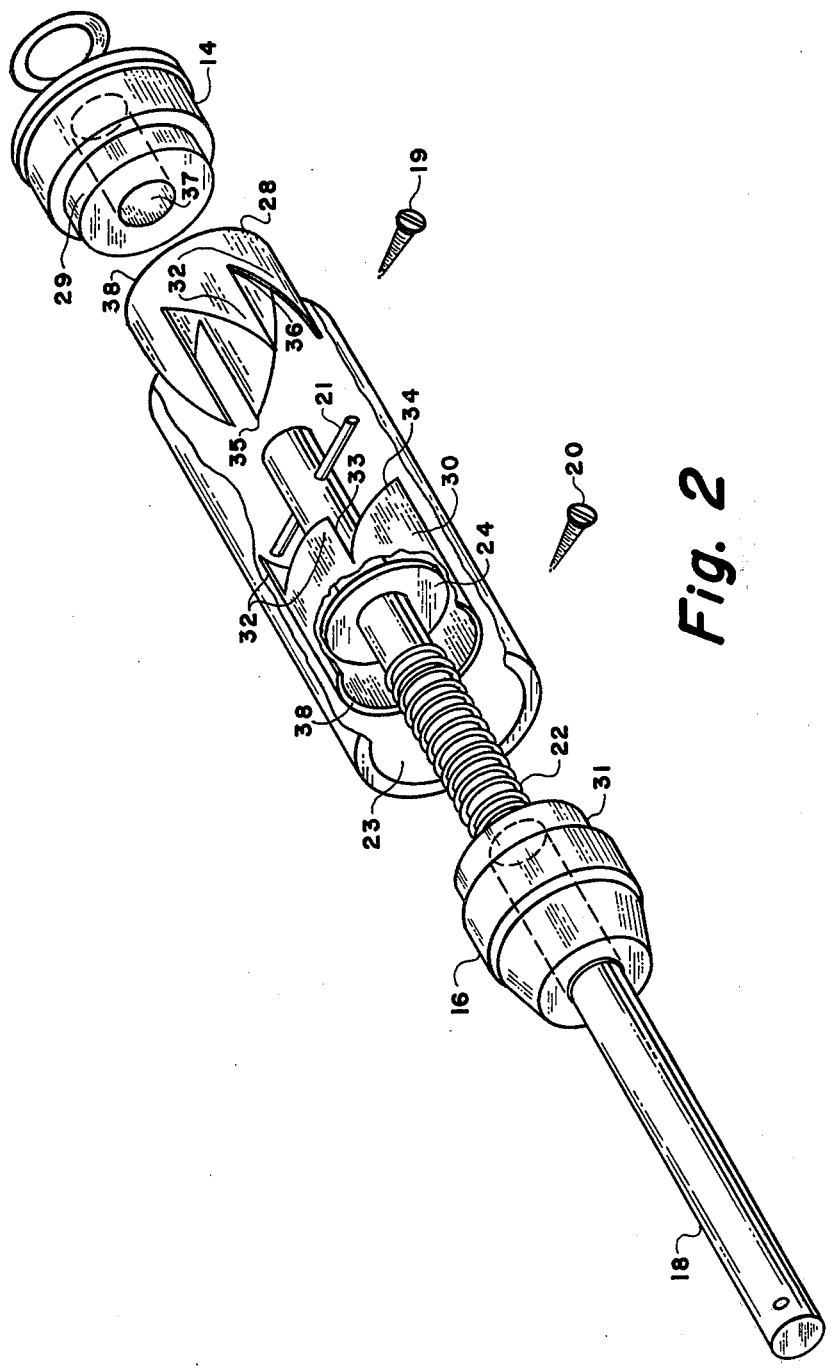
FIG. 2 is an exploded perspective view of the apparatus of FIG. 1.

Upper toothed member 28, having the form of a cylindrical band, is fixedly seated on depending shoulder 29 of upper closure 14. Lower toothed member 30, having the form of a cylindrical band of equal diameter to upper toothed member 28 and coaxially aligned therewith, is fixedly seated on raised shoulder 31 of lower closure 16. As shown more clearly in FIG. 2, upper closure 14 contains an axial channel 37 to accommodate the upper portion of pull rod 18.

Vertically disposed teeth 32 extend downwardly from upper toothed member 28 and upwardly from lower toothed member 30 in sawtooth facing relationship. Each tooth is comprised of a vertical edge 33 and contiguous angled edge 34, forming apexes 35 directed toward the opposing toothed member, and bights 36 directed away from their associated apexes and spaced apart from the associated shoulder members of said closures. The alignment of the teeth 32 at the proximal or facing ends of said toothed members is such that a vertical edge 33, if linearly extended, would intersect an angled edge 34 of a tooth on the opposing toothed member. It should also be noted that the angle of inclination of the angled edges 34 of the teeth of one toothed member is opposite in direction to the angle of inclination of the opposing angled edges. The locus of apexes of the teeth of a given toothed member defines a circle in plane perpendicular to the center axis of said toothed member. Said circle may be considered the proximal end of the toothed member. The opposite, or distal end 38 of each toothed member may have the configuration of a circle lying in a plane perpendicular to the axis of the toothed member. It should be noted that the spacing between the proximal ends of said toothed members may be very close, and may in fact overlap, whereby apexes of one member might extend into the V-shaped notches between the opposing teeth. The spacing between the proximal ends of said toothed members should however permit passage of bearing pin 21.

The diameter of the toothed members, and the height of the teeth, measured from bight to apex, are not critical features. In preferred embodiments however, greater efficiency of operation is achieved when the ratio of the outside diameter of the toothed member to the height of the teeth is between 1.0 and 4.0. It is further preferred that the acute angle of the angled edges of the teeth relative to a horizontal plane be between 20° and 70°, and more preferably between 30° and 60°. Such preferred angles of the angled edges provide a more positive translational movement of the bearing pin during operation. Preferred embodiments of toothed member will have four equally dimensioned teeth symmetrically disposed in a circular periphery about the axis. However, embodiments having six, eight and more teeth may also be employed. The apexes of said teeth, shown to be pointed, may be rounded in certain embodiments.

Although the embodiment of the apparatus exemplified in the drawings involves the use of separate parts in a particular manner of assembly, it is apparent that certain structural simplifications may be achieved by standard fabrication methods. For example, upper closure 14 and upper toothed member 28 may be molded from plastic or metal as a single integral unit. Similarly, lower closure 16 and lower toothed member 30 may be of integral construction.

Spacing harness 15, exemplified as a cylindrical tube, functions to maintain the spacing and alignment of the toothed members, and may have any of various ornamental configurations.

Coil spring 22 may be replaced by restoring means utilizing resilient characteristics, counterbalancing weights, pneumatic cylinders, or other equivalent means to achieve the desired effect of causing the pull rod to rise when downward force is removed therefrom.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A rotative apparatus for pendantly suspending an object comprising:
   (a) coaxially spaced upper and lower opposed toothed members each possessing an even number of uniformly spaced vertically disposed teeth in a circular sawtooth array, each tooth having a vertical edge parallel to the center axis of said toothed members and a contiguous angled edge meeting with said vertical edge as an apex at the outermost reach of said teeth and meeting with the next adjacent vertical edge to form a substantially V-shaped bight at the base of said teeth, the direction of the angled edges of the teeth of one toothed member being opposite to the direction of the angled edges of the teeth of the opposed toothed member, said toothed members being aligned such that the vertical edges of the teeth of one toothed member are opposite the angled edges of the teeth of the opposed toothed member;
   (b) means for maintaining said toothed members in fixed spaced relationship;
   (c) a pull rod coaxially positioned with respect to said toothed members, extending below said lower toothed member and adapted for linear movement along said axis;
   (d) means for pendantly suspending an object from said pull rod at a site below said lower toothed member;
   (e) a bearing pin transversely associated with said pull rod adjacent the uppermost extremity thereof and adapted to engage said teeth at two sites diametrically across said axis;
   (f) means for causing said pull rod to rise when no significant downward force is applied thereto; and
   (g) means for attaching said apparatus to an overhead support; whereby said pull rod rises when downward force is removed therefrom, causing said bearing pin to engage the angled edges of the teeth of said upper toothed member and traverse said edges while rotating said pull rod until stopping at bights in said upper toothed member, and said pull rod descends when downward force is restored thereto, causing said bearing pin to engage the angled edges of the teeth of said lower toothed member and traverse said edges while rotating said pull rod until stopping at bights in said lower toothed member.

2. The apparatus of claim 1 wherein said toothed members are circular and of equal diameter.

3. The apparatus of claim 1 wherein said means for causing the pull rod to rise is comprised of a coil spring positioned on said pull rod.

4. The apparatus of claim 1 wherein said means for maintaining said toothed members in fixed spaced relationship is an elongated structure having closure means adjacent each end.

5. The apparatus of claim 1 wherein the teeth of a given toothed member are of equal height and said apexes lie in a plane perpendicular to said axis.

6. The apparatus of claim 5 wherein the acute angle of the angled edges of said teeth relative to said plane is between 20° and 70°.

7. Apparatus of claim 5 wherein each toothed member contains four teeth.

8. Apparatus of claim 4 wherein said elongated structure has a cylindrical configuration.

* * * * *